(12) United States Patent
Gudipudi et al.

(10) Patent No.: US 7,961,645 B2
(45) Date of Patent: Jun. 14, 2011

(54) METHOD AND SYSTEM FOR CLASSIFYING DEVICES IN A WIRELESS NETWORK

(75) Inventors: Srinivas Gudipudi, Hyderabad (IN); Rohit Shankar, Hyderabad (IN); Rohit Pyati, Andhra Pradesh (IN); Kartik Singh, Secunderabad (IN)

(73) Assignee: Computer Associates Think, Inc., Islandia, NY (US)

( * ) Notice: Subject to any disclaimer, the term of this patent is extended or adjusted under 35 U.S.C. 154(b) by 1002 days.

(21) Appl. No.: 11/466,501

(22) Filed: Aug. 23, 2006

(65) Prior Publication Data

US 2008/0049642 A1    Feb. 28, 2008

(51) Int. Cl.
*H04L 12/28* (2006.01)
(52) U.S. Cl. ........................................ 370/254
(58) Field of Classification Search .................. None
See application file for complete search history.

(56) References Cited

U.S. PATENT DOCUMENTS

| | | | |
|---|---|---|---|
| 6,611,863 B1 * | 8/2003 | Banginwar | 709/220 |
| 6,633,757 B1 | 10/2003 | Hermann et al. | |
| 6,785,542 B1 | 8/2004 | Blight et al. | |
| 6,879,806 B2 | 4/2005 | Shorty | |
| 6,950,645 B1 | 9/2005 | Kammer et al. | |
| 7,263,552 B2 * | 8/2007 | Govindarajan et al. | 709/224 |
| 7,380,025 B1 * | 5/2008 | Riggins et al. | 710/8 |
| 7,430,594 B2 * | 9/2008 | Krupczak | 709/223 |
| 7,437,432 B2 * | 10/2008 | Bodin et al. | 709/220 |
| 7,440,408 B1 * | 10/2008 | Anderson | 370/252 |
| 2002/0068559 A1 * | 6/2002 | Sharma et al. | 455/423 |
| 2002/0120750 A1 | 8/2002 | Nidd | |
| 2003/0103484 A1 * | 6/2003 | Oommen et al. | 370/338 |
| 2004/0123091 A1 * | 6/2004 | Das | 713/2 |
| 2005/0097222 A1 * | 5/2005 | Jiang et al. | 709/245 |
| 2005/0286478 A1 | 12/2005 | Mela et al. | |
| 2006/0023642 A1 * | 2/2006 | Roskowski et al. | 370/254 |
| 2007/0002767 A1 * | 1/2007 | Holman et al. | 370/255 |
| 2008/0025234 A1 * | 1/2008 | Zhu et al. | 370/256 |

* cited by examiner

*Primary Examiner* — Chirag G Shah
*Assistant Examiner* — Amarnauth Persaud
(74) *Attorney, Agent, or Firm* — Baker Botts L.L.P.

(57) ABSTRACT

According to one embodiment of the invention, a method for classifying devices in a wireless network includes discovering, by a managing device, devices in the wireless network in accordance with discovery parameters. The discovery parameters include a parameter indicative of an IP address range. The method also includes retrieving, by the managing device, classification parameters from the devices. The method further includes comparing, by the managing device, the classification parameters with classification rules. The method further includes storing a device profile for each of the devices with classification parameters satisfying the classification rules.

21 Claims, 2 Drawing Sheets

METHOD AND SYSTEM FOR CLASSIFYING DEVICES IN A WIRELESS NETWORK

TECHNICAL FIELD OF THE INVENTION

This invention relates generally to wireless networks, and more particularly, to a method and system for classifying devices in a wireless network.

BACKGROUND OF THE INVENTION

Conventional computer networks use wires or optical fibers as the common carrier medium. However, due to improved data rates and decreasing equipment prices, businesses are rapidly adopting wireless networks as a cost effective networking solution. Using wireless network technology, businesses can easily solve end user, or client, requests and provide immediate connectivity without having to install wiring as employees move within buildings or from building to building.

The augmentation of clients wishing to communicate in various wireless network environments has caused many wireless networking systems to respond by adding elements to accommodate the increase in traffic. As wireless networks grow in size and complexity, the management and control of these wireless networks becomes more difficult. Accordingly, it is generally desirable to provide an effective management and control mechanism in wireless networks.

OVERVIEW OF EXAMPLE EMBODIMENTS

According to one embodiment of the invention, a method for classifying devices in a wireless network includes discovering, by a managing device, devices in the wireless network in accordance with discovery parameters. The discovery parameters include a parameter indicative of an IP address range. The method also includes retrieving, by the managing device, classification parameters from the devices. The method further includes comparing, by the managing device, the classification parameters with classification rules. The method further includes storing a device profile for each of the devices with classification parameters satisfying the classification rules.

Technical advantages of particular embodiments of the present invention include a method and system for classifying devices in a wireless network that discovers devices either by command or periodically. Thus, an administrator of the wireless network can generate a real-time report of devices in the network.

Another technical advantage of particular embodiments of the present invention includes a method and system for classifying devices in a wireless network that classifies devices based on dynamic rules. Thus, if a new device is added to the network, the rules may be configured to classify the new device.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 1A:
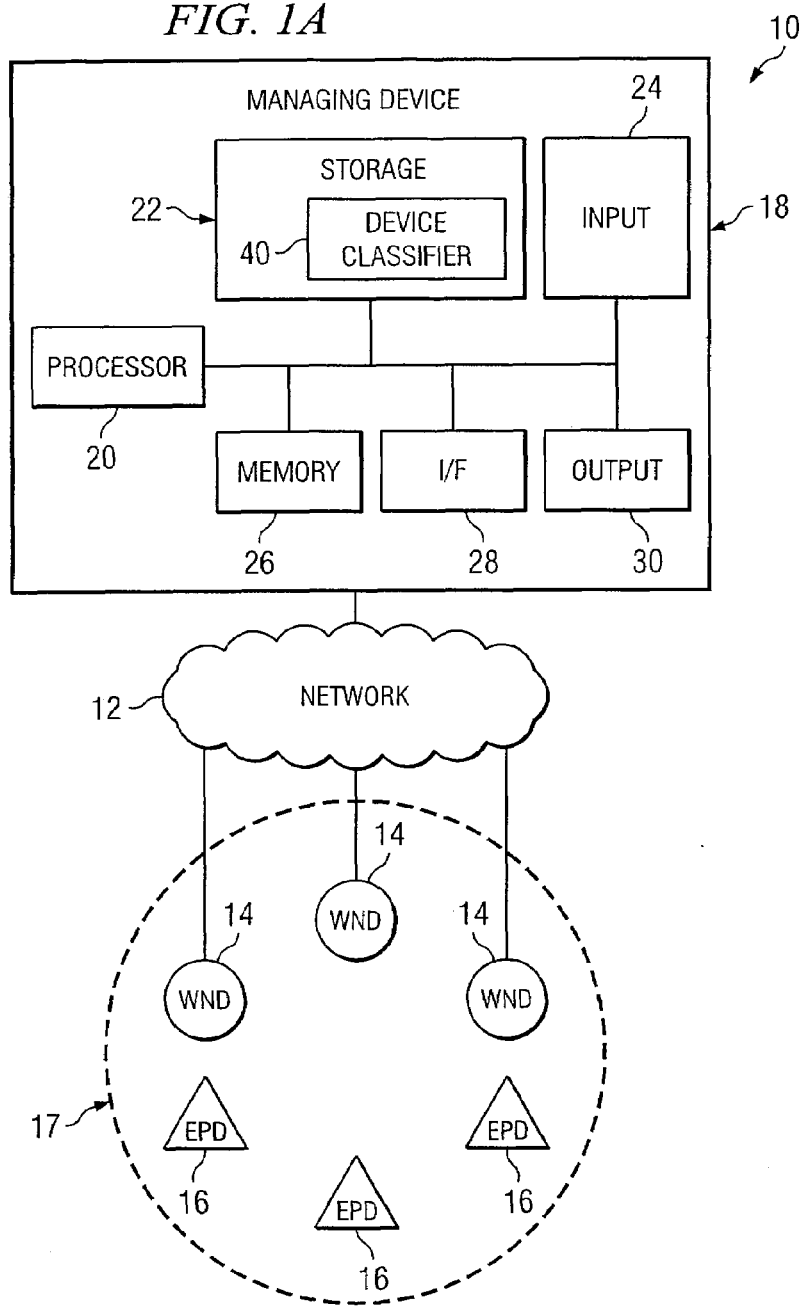
FIG. 1A illustrates a system that incorporates aspects of the present invention.
Figure 1B:
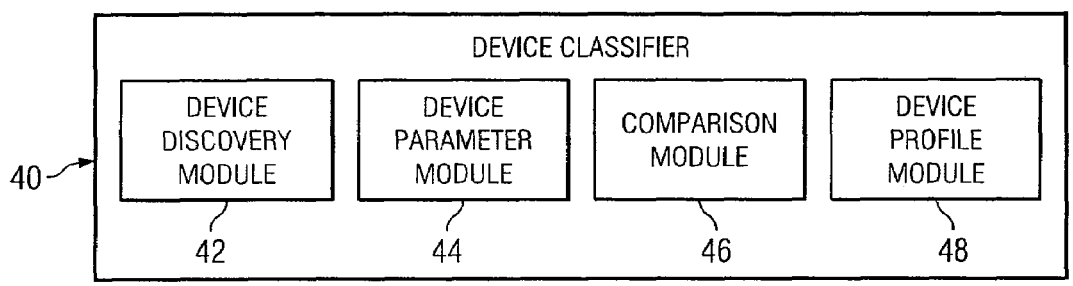
FIG. 1B illustrates an example device classifier in accordance with an embodiment of the present invention.
Figure 2:
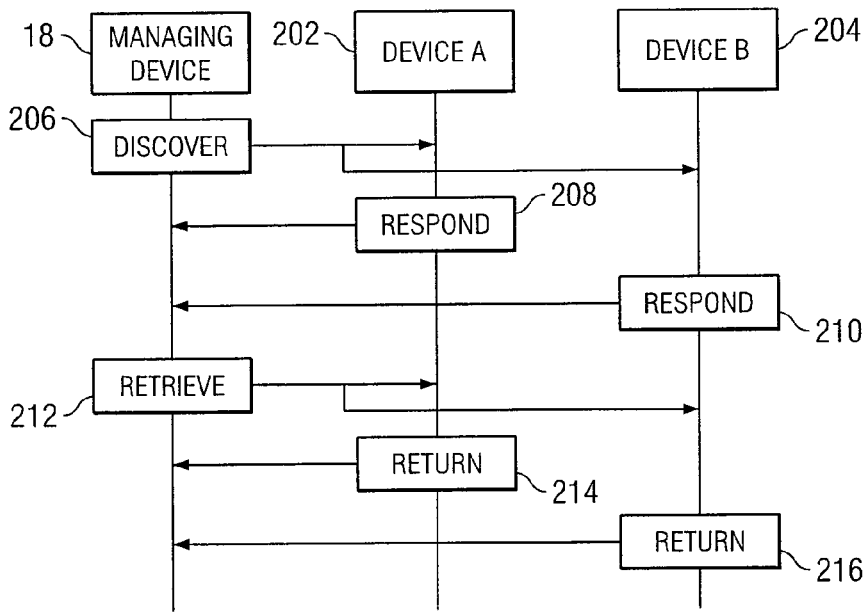
FIG. 2 is a call flow diagram for retrieving classification parameters from devices in a wireless network.
Figure 3:
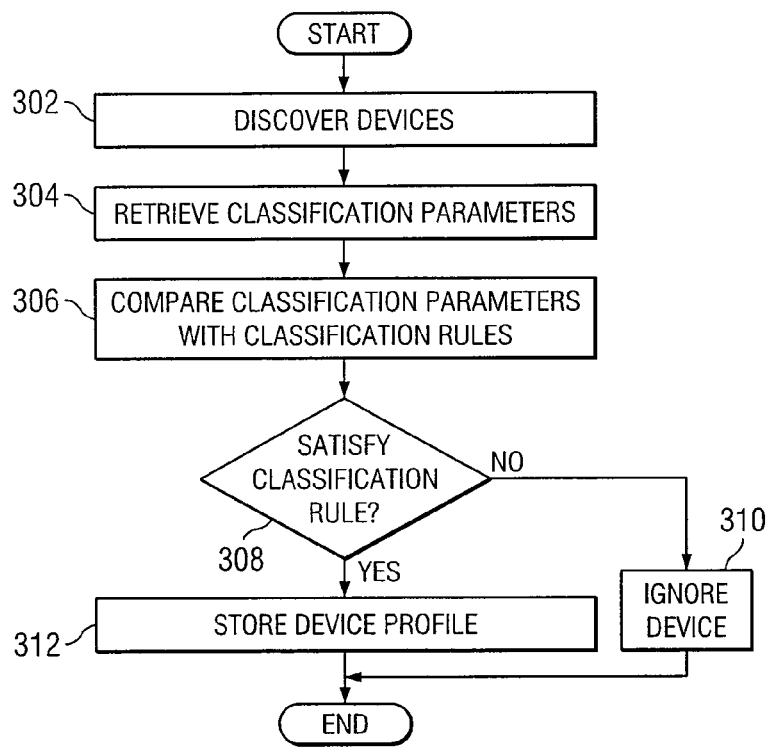
FIG. 3 is a flow diagram for classifying devices in a wireless network.

Embodiments of the present invention and its advantages are best understood by referring to FIGS. 1 through 3 of the drawings, like numerals being used for like and corresponding parts of the various drawings.

FIG. 1A illustrates one embodiment of a system 10 for classifying devices in a wireless network. As shown in FIG. 1A, system 10 generally includes a network 12, one or more wireless network devices 14, one or more endpoint devices 16, a wireless network range 17, and a managing device 18. System 10 is particularly adapted for discovering devices and classifying the devices based on classification parameters.

Network 12 may refer to any interconnecting system capable of transmitting audio, video, signals, data, messages, or any combination of the preceding. Network 12 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In particular embodiments of the invention, network 12 may transmit information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

Wireless network device 14 may be any network point suitable to couple an endpoint device, such as endpoint device 16, to a network, such as network 12. Wireless network device 14 may be, for example, a session border controller, gatekeeper, call manager, conference bridge, router, hub, switch, gateway, access point, edge point, or any other hardware or software operable to couple an endpoint device, such as endpoint device 16, to a network.

According to one embodiment of the invention, wireless network device 14 may have a wired connection to network 12. According to another embodiment of the invention, wireless network device 14 may have a wireless connection to network 12. According to yet another embodiment of the invention, wireless network device 14 may include a receiver or transmitter or both a receiver and a transmitter. As an example, wireless network device 14 may include an omni directional antenna operable to communicate with one or more endpoint devices.

Endpoint device 16 may refer to any suitable device operable to communicate with network 12 through a wireless network device 14. Endpoint device 16 may execute with any of the well-known MS-DOS, PC-DOS, OS-2, MAC-OS, WINDOWST™, UNIX, or other appropriate operating systems, including future operating systems. Endpoint device 16 may include, for example, a personal digital assistant, a computer such as a laptop, a cellular telephone, a mobile handset, or any other device operable to communicate with network 12 through wireless network device 14.

Wireless network range 17 may refer to any suitable signal range for communications between devices, such as wireless network device 14 and endpoint device 16. In particular embodiments of the invention, communications between wireless network device 14 and endpoint device 16 are communicated in wireless network range 17 according to one or more secure wireless communication protocols or WLAN protocols, such as portions or all of the Wired Equivalent Privacy (WEP) protocol, the Robust Security Network (RSN) associated with the IEEE 802.11i protocol, the IEEE 802.1x protocol, the Advanced Encryption Standard (AES), the Temporal Key Integrity Protocol (TKIP), Extensible Authentication Protocol over LAN (EAPOL) algorithms or protocols (such as EAP-TTLS, PEAP, or CISCO's LEAP or EAP-FAST protocols, for example), WiFi Protected Access (WPA) protocol, WiFi Protected Access Pre-shared key (WPA-PSK) protocol, WiFi Protected Access Version 2 (WPA2) protocol, or WiFi Protected Access Version 2 Pre-shared key (WPA2-PSK) protocol, for example.

Managing device 18 represents any device suitable to discover and classify a device, such as wireless network device 14 and endpoint device 16. Managing device 18 may retrieve classification parameters from each of the devices. The classification parameters may be device-specific attributes or characteristics that identify devices to be managed by managing device 18. Although FIG. 1A provides one example of managing device 18 as operating within network 12, in other embodiments managing device 18 may operate as a wireless device connecting to network 12 through a wireless network device 14. Additional details of one example of managing device 18 are described in more detail below.

In various embodiments of the invention, a device, such as wireless network device 14 and endpoint device 16, may connect to network 12. Discovering the device and determining device-specific information for the device can be a complicated and time consuming process. Typically, the discovery and determination of devices is primarily a manual process. The process requires an administrator to manually keep track of each device that is added and removed from the network.

According to one embodiment of the invention, a system and method are provided that automatically discover new devices and automatically retrieve device-specific information for device classification. This is effected by storing dynamic configuration rules at the managing device and configuring the rules to respond to new devices on the network. Additional details of example embodiments of the invention are described in greater detail below in conjunction with portions of FIG. 1A, FIG. 1B, FIG. 2, and FIG. 3.

According to the illustrated embodiment of the invention, managing device 18 includes a processor 20, a storage device 22, an input device 24, a memory device 26, an interface 28, an output device 30, and a device classifier 40.

Processor 20 may refer to any suitable device operable to execute instructions and manipulate data to perform operations for managing device 18. Processor 22 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information.

Input device 24 may include, for example, a keyboard, mouse, graphics tablet, joystick, light pen, microphone, scanner, or other suitable input device.

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for managing device 18, send output from managing device 18, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows managing device 18 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Device classifier 40 may refer to any suitable logic embodied in computer-readable media, and when executed, operable to discover a device, such as wireless network device 14 and endpoint device 16, and classify the device according to classification parameters. In the illustrated embodiment of the invention, device classifier 40 resides in storage device 22. In other embodiments of the invention, device classifier 40 may reside in memory device 26, or any other suitable device operable to store and facilitate retrieval of data and instructions.

FIG. 1B illustrates an example device classifier 40 in accordance with an embodiment of the present invention. Device classifier 40 may include various modules operable to perform various functions, including a device discovery module 42, a device parameter module 44, a comparison module 46, and a device profile module 48.

According to one embodiment of the invention, device discovery module 42 may discover devices using any suitable protocol. For example, device discovery module 42 may discover devices using Internet Control Message Protocol (ICMP). Under ICMP, device discovery module 42 may "ping" devices and await replies to determine if a device is operating on the wireless network. As another example, device classifier may discover devices using Simple Network Management Protocol (SNMP). Under SNMP, device discovery module 42 can exchange information with devices through messages technically known as protocol date units (PDUs). However, the present disclosure contemplates many types of discovery protocols. Various embodiments may include, some, all, or none of the enumerated protocols.

According to one embodiment of the invention, device discovery module 42 may discover devices periodically. For example, device discovery module 42 may be configured to "ping" for new or updated devices daily. In other embodiments, device discovery module 42 may be configured to discover devices on command. For example, device discovery module 42 may be configured to "ping" for new or updated devices on command by an administrator.

According to one embodiment of the invention, device discovery module 42 may discover devices according to one or more discovery parameters. Discovery parameters may include, for example, a filter to narrow the discovered devices. For example, device discovery module 42 may discover devices according to a range of IP addresses. For example, a discovery parameter may have an IP address range of 192.168.10.10 to 192.168.10.19. Discovery module 42 may attempt to discover devices in the IP address range of 192.168.10.10 to 192.168.10.19. As another example, discovery module 42 may discover devices according to a hostname regular expression. For example, a discovery parameter may have a hostname regular expression of "corporate-network." Devices with "corporate-network" located in their hostname may be discovered by device discovery module 42. However, the present disclosure contemplates many types of discovery parameters. Various embodiments may include, some, all, or none of the enumerated discovery parameters.

According to one embodiment of the invention, device parameter module 44 may retrieve classification parameters from discovered devices. Classification parameters may be, for example, device characteristics or attributes. For example, device parameter module 44 may retrieve a device vendor, such as "Cisco," from a device. As another example, device parameter module 44 may retrieve a device model, such as "2600," from a device. As another example, device parameter module 44 may retrieve a device firmware version, such as "IOS 11.2," from a device. However, the present disclosure contemplates many types of classification parameters. Various embodiments may include some, all, or none of the enumerated classification parameters.

According to one embodiment of the invention, device parameter module 44 may send commands directly to devices to retrieve classification parameters from the devices. In various embodiments, device parameter module 44 may retrieve the classification parameters from other sources, such as applications running on the network. Classification parameters may be retrieved using any suitable protocol such as ICMP, SNMP, Hypertext Transfer Protocol (HTTP), TELNET, or any other suitable protocol operable to exchange information with devices.

According to one embodiment of the invention, comparison module 46 may compare the classification parameters with the classification rules in order to determine a classification of the device. For example, a classification rule may classify a device with a device vendor of "Cisco," a device model of "2600," and a device firmware version of "IOS 11.2" to a device classification of "router." As another example, a classification rule may classify a device with a device vendor of "Linksys," a device model of "WAP11," and a device firmware version of "1.40" to a device classification of "access point."

According to one embodiment of the invention, the classification rules may be stored in any suitable configurable data repository on computer readable media, such as storage device 22. For example, the classification rules may be stored in an Extensible Markup Language (XML) file. XML is a flexible syntax for describing data. Based on data type definition (DTD) files or XML Schema language files, clients, such as administrators or automated scripts, can configure the device classification rules with XML tags. The self-describing XML tags map to information associated with the various devices. As new devices are added to network 12, such as wireless network device 14 and endpoint device 16, clients can add new XML tags to describe the new device. Thus the device may be discovered and classified by device classifier 40. However, other configurable data repository could equally be employed in alternative embodiments. For example, the classification rules may be, for example, a standard ASCII text file with some proprietary format, a database, an HTML file, or other suitable data repository.

According to one embodiment of the invention, device profile module 48 may store a device profile for a device if the device has classification parameters that match a classification rule. Each device profile may store classification information specific to a device, and may include device type, device vendor, device model, device firmware, or any other device-specific information for use by managing device 18.

According to one embodiment of the invention, the devices classified by device classifier 40 may be classified by agents on the devices. An agent may be any suitable logic operable to report to device classifier 40 through managing device 18 whenever there is a significant status change to the device, and possibly on a regular basis to signify no changes. For example, a device may notify device classifier 40 with a status notification. A notification may include, for example, a notification that the device connected to the network. The device classifier 40 may then discover and classify the device through a customizable agent on the device. In other embodiments, device classifier 40 may communicate with the device using other protocols such as Simple Network Management Protocol (SNMP), thereby allowing third-party software agents and hardware devices to be managed.

FIG. 2 is a call flow diagram for retrieving classification parameters from devices in a wireless network that may be used with the system of FIG. 1A. The method begins at step 206, where managing device 18 sends a request to discover device A 202 and device B 204. This can be done by using, for example, ICMP or any other well known technique. Under ICMP, managing device 18 can "ping" each of device A 202 and device B 204 by sending out ICMP messages and awaiting replies.

Device A 202 and device B 204 may respond to managing device 18 at steps 208 and 210, respectively. Device A 202 and device B 204 may respond using any suitable communication method, such as ICMP or SNMP, for example. For example, if managing device 18 discovers device A 202 using an ICMP "ping" technique, device A 202 may respond to managing device 18 with an ICMP message, notifying managing device 18 that device A 202 is on the network and listening for requests.

At step 212, managing device 18 sends a request to retrieve classification parameters from device A 202 and device B 204. In various embodiments, managing device 18 may request classification parameters directly from device A 202 and device B 204. For example, managing device 18 may retrieve classification parameters from devices using SNMP, and send a request to a discovered device to retrieve a particular piece of management information. In other embodiments, managing device 18 may retrieve the classification parameters from other sources, such as applications running on the network.

At step 214 and 216, device A 202 and device B 204 may return device classification parameters to managing device 18. Classification parameters may include, for example, a device vendor, a device model, an IP address, a hostname, or any other suitable device identifier. Managing device 18 may use this information to classify device A 202 and device 204 according to classification rules.

FIG. 3 is a flow diagram illustrating example acts associated with classifying devices in a wireless network. The example acts may be performed by device classifier 40, as discussed above with reference to FIG. 1A and FIG. 1B. At step 302, devices are discovered in the wireless network. For example, devices may be discovered using ICMP. Under ICMP, devices may be "pinged" to determine if the device is operating on the wireless network. As another example, devices may be discovered using SNMP. Under SNMP, devices can exchange information with other devices through messages.

At step 304, classification parameters are retrieved from the discovered devices. Classification parameters may be, for example, device characteristics or attributes. For example, classification parameters may include a device vendor, a device model, a device firmware version, or any other device-specific information.

At step 306, the retrieved classification parameters are compared across a set of classification rules. For example, a classification rule may classify a device with a device vendor of "Cisco," a device model of "2600," and a device firmware version of "IOS 11.2" to a device classification of "router." As another example, a classification rule may classify a device with a device vendor of "Linksys," a device model of "WAP11," and a device firmware version of "1.40" to a device classification of "access point." The classification rules may be stored in any suitable configurable data file stored on computer readable media. The classification rules may be stored, for example, in an XML file.

A determination may be made at step 308 as to whether the parameters satisfy the classification rules. Where the classification parameters do not satisfy the classification rules, the device is ignored at step 310. Alternatively, if the classification parameters do satisfy the classification rules, a device profile is stored at step 312. Each device profile may store classification information specific to a device, and may include device type, device vendor, device model, device firmware, or any other device-specific information. Thus, as a network grows in size and complexity, the intelligent discovery and classification of devices into a device profile using configurable classification rules significantly enhances network management and control.

Although the present invention has been described in several embodiments, a myriad of changes, variations, alterations, transformations, and modifications may be suggested to one skilled in the art and it is intended that the present invention encompass such changes, variations, alterations, transformations, and modifications as falling within the spirit and scope of the appended claims.

What is claimed is:

1. A method for classifying devices in a wireless network, comprising:
   discovering, by a managing device, one or more devices in the wireless network in accordance with one or more discovery parameters, the one or more discovery parameters comprising a parameter indicative of an IP address range and a parameter indicative of a hostname regular expression;
   retrieving, by the managing device, a plurality of classification parameters from each of the one or more devices, the plurality of classification parameters comprising a parameter indicative of a device vendor, a parameter indicative of a device model, and a parameter indicative of a device firmware version;
   comparing, by the managing device, the received plurality of classification parameters with one or more classification rules, the one or more classification rules stored in an Extensible Markup Language (XML) file; and
   storing a device profile for each of the one or more devices with classification parameters satisfying the one or more classification rules for use by the managing device.

2. The method of claim 1, further comprising discovering the one or more devices in the wireless network using Simple Network Management Protocol (SNMP).

3. The method of claim 1, further comprising discovering the one or more devices in the wireless network using Internet Control Message Protocol (ICMP).

4. The method of claim 1, further comprising retrieving the plurality of classification parameters using Simple Network Management Protocol (SNMP).

5. The method of claim 1, further comprising retrieving the plurality of classification parameters using Hypertext Transfer Protocol (HTTP).

6. The method of claim 1, further comprising retrieving the plurality of classification parameters using TELNET.

7. The method of claim 1, further comprising receiving, at the managing device, a status notification from at least one of the one or more devices in the wireless network.

8. A system for classifying devices in a wireless network, comprising:
   a wireless network, the wireless network comprising one or more devices; and
   a managing device operable to connect to the wireless network, the managing device comprising:
   a processor; and
   a storage device embodying a program of instructions operable, when executed on the processor, to:
   discover one or more devices in the wireless network in accordance with one or more discovery parameters, the one or more discovery parameters comprising a parameter indicative of an IP address range and a parameter indicative of a hostname regular expression;
   retrieve a plurality of classification parameters from each of the one or more devices, the plurality of classification parameters comprising a parameter indicative of a device vendor, a parameter indicative of a device model, and a parameter indicative of a device firmware version;
   compare the received plurality of classification parameters with one or more classification rules, the one or more classification rules stored in an Extensible Markup Language (XML) file; and
   store a device profile for each of the one or more devices with classification parameters satisfying the one or more classification rules for use by the managing device.

9. The system of claim 8, wherein the program of instructions is further operable to discover the one or more devices in the wireless network using Simple Network Management Protocol (SNMP).

10. The system of claim 8, wherein the program of instructions is further operable to discover the one or more devices in the wireless network using Internet Control Message Protocol (ICMP).

11. The system of claim 8, wherein the program of instructions is further operable to retrieve the plurality of classification parameters using Simple Network Management Protocol (SNMP).

12. The system of claim 8, wherein the program of instructions is further operable to retrieve the plurality of classification parameters using Hypertext Transfer Protocol (HTTP).

13. The system of claim 8, wherein the program of instructions is further operable to retrieve the plurality of classification parameters using TELNET.

14. The system of claim 8, wherein the program of instructions is further operable to receive a status notification from at least one of the one or more devices in the wireless network.

15. Logic encoded in a non-transitory computer-readable storage medium, the logic being operable, when executed on a processor, to:
   discover one or more devices in the wireless network in accordance with one or more discovery parameters, the one or more discovery parameters comprising a parameter indicative of an IP address range and a parameter indicative of a hostname regular expression;

retrieve a plurality of classification parameters from each of the one or more devices, the plurality of classification parameters comprising a parameter indicative of a device vendor, a parameter indicative of a device model, and a parameter indicative of a device firmware version;

compare the received plurality of classification parameters with one or more classification rules, the one or more classification rules stored in an Extensible Markup Language (XML) file; and store a device profile for each of the one or more devices with classification parameters satisfying the one or more classification rules for use by the managing device.

16. The logic of claim 15, wherein the logic is further operable to discover the one or more devices in the wireless network using Simple Network Management Protocol (SNMP).

17. The logic of claim 15, wherein the logic is further operable to discover the one or more devices in the wireless network using Internet Control Message Protocol (ICMP).

18. The logic of claim 15, wherein the logic is further operable to retrieve the plurality of classification parameters using Simple Network Management Protocol (SNMP).

19. The logic of claim 15, wherein the logic is further operable to retrieve the plurality of classification parameters using Hypertext Transfer Protocol (HTTP).

20. The logic of claim 15, wherein the logic is further operable to retrieve the plurality of classification parameters using TELNET.

21. The logic of claim 15, wherein the logic is further operable to receive a status notification from at least one of the one or more devices in the wireless network.

* * * * *